United States Patent
Menon (10) Patent No.: US 11,552,883 B1
(45) Date of Patent: Jan. 10, 2023

(54) SESSION ESTABLISHMENT USING PATH CHANGE

(71) Applicant: Juniper Networks, Inc., Sunnyvale, CA (US)

(72) Inventor: Abilash Menon, Boxborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/449,435

(22) Filed: Sep. 29, 2021

(51) Int. Cl.
*H04L 45/28* (2022.01)
*H04L 45/24* (2022.01)
*H04L 45/42* (2022.01)
*H04L 45/00* (2022.01)

(52) U.S. Cl.
CPC .............. *H04L 45/28* (2013.01); *H04L 45/22* (2013.01); *H04L 45/24* (2013.01); *H04L 45/42* (2013.01)

(58) Field of Classification Search
CPC ......... H04L 45/28; H04L 45/22; H04L 45/24; H04L 45/42
See application file for complete search history.

(56) References Cited

U.S. PATENT DOCUMENTS

| | | | |
|---|---|---|---|
| 9,729,439 B2 * | 8/2017 | MeLampy | H04L 47/2483 |
| 9,729,682 B2 * | 8/2017 | Kumar | H04L 69/325 |
| 9,762,485 B2 * | 9/2017 | Kaplan | H04L 49/30 |
| 9,871,748 B2 * | 1/2018 | Gosselin | H04L 43/04 |
| 9,985,872 B2 * | 5/2018 | Jaffer | H04L 45/70 |
| 9,985,883 B2 * | 5/2018 | MeLampy | H04L 61/00 |
| 10,200,264 B2 * | 2/2019 | Menon | H04L 43/0829 |
| 10,277,506 B2 * | 4/2019 | Timmons | H04L 45/54 |
| 10,432,519 B2 * | 10/2019 | Baj | H04L 45/70 |
| 10,432,522 B2 * | 10/2019 | Kaplan | H04L 61/2521 |
| 11,165,863 B1 * | 11/2021 | Timmons | H04L 41/0893 |
| 2010/0218033 A1 * | 8/2010 | Safari | H04L 69/40 |
| | | | 709/248 |
| 2016/0164780 A1 * | 6/2016 | Timmons | H04L 45/70 |
| | | | 370/238 |
| 2017/0346709 A1 * | 11/2017 | Menon | H04L 45/70 |
| 2017/0346726 A1 * | 11/2017 | Menon | H04L 43/0811 |
| 2017/0373972 A1 * | 12/2017 | Kaplan | H04L 61/2521 |

(Continued)

OTHER PUBLICATIONS

Schlinker, Brandon, et al. "Engineering egress with edge fabric: Steering oceans of content to the world." Proceedings of the Conference of the ACM Special Interest Group on Data Communication. 2017.*

(Continued)

*Primary Examiner* — Jimmy H Tran
(74) *Attorney, Agent, or Firm* — Shumaker & Sieffert, P.A.

(57) ABSTRACT

As described herein, a router signals a source device to establish a new stateful communication session with a destination device by changing a network path used by traffic associated with the session. In one example, a router forwards traffic of a first stateful routing session established by the source device along a first path. In response to determining that that the first path should not be used, the router forwards a packet of the first session along a second path. The destination device recognizes the change in path, which causes the destination device to reject the packet, which in turn causes the source device to establish a second stateful routing session. The router forwards subsequent traffic of the second stateful routing session along the second path.

20 Claims, 3 Drawing Sheets

(56) References Cited

U.S. PATENT DOCUMENTS

| | | | |
|---|---|---|---|
| 2018/0097720 A1* | 4/2018 | Jaffer | H04L 45/70 |
| 2018/0343196 A1* | 11/2018 | Baj | H04L 45/70 |
| 2020/0366589 A1* | 11/2020 | Kaplan | H04L 45/04 |
| 2020/0366590 A1* | 11/2020 | Kaplan | H04L 67/563 |
| 2020/0366598 A1* | 11/2020 | Kaplan | H04L 45/02 |
| 2020/0366599 A1* | 11/2020 | Kaplan | H04L 45/34 |
| 2020/0403890 A1* | 12/2020 | McCulley | H04L 43/04 |
| 2021/0036953 A1* | 2/2021 | Menon | H04L 47/16 |
| 2021/0226884 A1* | 7/2021 | Jaffer | H04L 47/34 |
| 2021/0409323 A1* | 12/2021 | Menon | H04L 12/4641 |
| 2022/0038311 A1* | 2/2022 | Shen | H04L 12/66 |

OTHER PUBLICATIONS

"Transmission Control Protocol," DARPA Internet Program Protocol Specification, Information Sciences Institute, RFC 793, Sep. 1981, 91 pp.

Dierks et al., "The Transport Layer Security (TLS) Protocol Version 1.2," Network Working Group, RFC 5246, Aug. 2008, 105 pp.

Katz et al., "Bidirectional Forwarding Detection (BFD)," RFC 5880, Internet Engineering Task Force, Jun. 2010, 49 pp.

Postel "Internet Control Message Protocol—DARPA Internet Program Protocol Specification," RFC 792, Information Sciences Institute, Network Working Group, Sep. 1981, 21 pp.

Postel, "User Datagram Protocol," RFC 768, Aug. 28, 1980, 3 pp.

Rescorla, "The Transport Layer Security (TLS) Protocol Version 1.3," Internet Engineering Task Force (IETF), RFC 8446, Aug. 2018, 160 pp.

U.S. Appl. No. 17/452,539, filed Oct. 27, 2021, naming inventors Timmons et al.

Extended Search Report from counterpart European Application No. 21214267.3 dated May 30, 2022, 7 pp.

* cited by examiner

SESSION ESTABLISHMENT USING PATH CHANGE

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes techniques for causing, by a router, a source device to establish a new stateful routing session established by the source device with a destination device by changing, by the router, a network path over which network traffic associated with the stateful routing session is forwarded. In some examples, a source device establishes a stateful routing session between the source device and a destination device. The stateful routing session comprises the forward packet flow and a reverse packet flow between the source device and the destination device. In some examples, the router performs session-based routing of the network traffic associated with the session such that the router forwards each packet of the forward packet flow in order along the same forward path and each packet of the reverse packet flow in order along the same reverse path, wherein the forward path and reverse path may or may not be the same.

The router may forward traffic for the stateful routing session along a first path between the source device and the destination device. In some examples, the first path may fail. While a conventional router may reroute all traffic for non-stateful routing sessions to an alternate path, the conventional router does not reroute traffic for stateful routing sessions. For example, traffic for multiple different sessions may be forwarded over a same first path. If the performance of the first path degrades, the first path may no longer satisfy Software License Agreement (SLA) requirements for a first service but may still satisfy SLA requirements for a second service. A conventional router performing non-stateful routing may redirect all traffic through the first path to a second path (e.g., all traffic associated with either the first or second sessions). However, a conventional router performing stateful routing does not have a mechanism to migrate only traffic associated with the first session to a second path while continuing to forward traffic associated with the second session over the first path that satisfies the SLA requirements for the second session.

Therefore, in the event of a failure of the first path in a conventional stateful routing system, a conventional router performing stateful routing may migrate traffic associated with a stateful routing session between the source device and the destination device to a second path only after the session times out. After timeout occurs, the source device establishes a new stateful routing session and resumes exchanging network traffic with the destination device. Where the stateful routing session is a stateful TCP session, this timeout may take a considerable amount of time to occur, and the source device resends any traffic sent during the time between the failure of the first path and the session timeout. Additionally, where the stateful routing session is carried through an Internet Protocol Security (IPsec) tunnel, timeout may never occur because the IPsec tunnel may carry traffic for other sessions, which keeps the IPsec tunnel alive and causes blackholing of traffic for the stateful routing session because the source device may continue attempting to resend traffic until an administrator reestablishes the tunnel. Furthermore, even if a conventional router detects such a failure in the first path, existing techniques do not provide a mechanism for a conventional router to signal the source device such that the source device may reestablish the session without waiting for the session to timeout.

In accordance with the techniques of the disclosure, a router may cause a source device to reestablish a stateful routing session established by the source device with a destination device by changing a network path over which network traffic associated with the stateful routing session is forwarded. As described in more detail below, by changing the network path of the stateful routing session, the router may cause the destination device to fail to recognize one or more packets received from the source device as belonging to the stateful routing session. In response to receiving such packets, the destination device rejects the packets. In response to the destination device rejecting the packets, the source device establishes a new stateful routing session. Therefore, the router may indirectly cause the source device to establish the new session by changing the network path over which network traffic associated with the stateful routing session is forwarded, which may enable the source device to establish a new stateful routing session faster than if the source device were required to wait for timeout of the original stateful routing session.

In one example, a router forwards, along a first path, packets of a first forward packet flow of a first stateful routing session established by a source device between the source device and a destination device. The first stateful routing session comprises the first forward packet flow and a first reverse packet flow between the source device and the destination device. The router performs stateful routing by forwarding each packet of the first plurality of packets in order along the same first path.

The router may determine that the first path should not be used for the first stateful routing session. For example, the router may detect a failure in the first path, such as a failure of a device or link along the first path. Alternatively, or additionally, the router may determine that a second path provides higher performance than the first path, or a determination that the second path has a higher priority than the first path, etc.

In response to the determination, the router forwards, along a second path, at least one packet of the first forward packet flow of the first session. The destination device recognizes the change in path, which causes the destination device to reject the at least one packet. In some examples, a first Network Address Translation (NAT) service along the first path may be applied to network traffic forwarded along the first path, while a second NAT service along the second path may be applied to network traffic forward along the second path. While forwarding the packets of the first forward packet flow along the first path, the first NAT service is applied to packets. However, when the router forwards the at least one packet along the second path, the second NAT service is applied to the at least one packet. The application of the second NAT service to the at least one packet causes the destination device to reject the at least one packet. For example, where the session is a TCP session, in response to receiving a mid-flow packet with a different source address, the destination device sends a TCP reset message to the source device. Where the session is transported over an IPsec tunnel, a tunnel endpoint of the destination device detects that a source IP of a midstream packet has changed, and therefore restarts negotiation of the IPsec tunnel with the source device.

The rejection of the at least one packet by the destination device in turn causes the source device to establish a second stateful routing session between the source device and the destination device. The router may ensure that packets of a second forward flow of the second stateful routing session are forwarded along the second path and not the first path. In this fashion, the router may indirectly cause the source device to establish a new stateful routing session with the destination device without having to wait for the full amount of time for the first stateful routing session to timeout upon a failure in the first path. The router may subsequently forward, along the second path, packets of the second forward packet flow of the second stateful routing session. Further, the router may perform stateful routing by forwarding each packet of the second forward packet flow in order along the same second path.

The techniques of the disclosure may provide specific improvements to the computer-related field of computer networking that have practical applications. For example, the techniques of the disclosure provide a mechanism for a router to signal a client device to reestablish a session without the need to modify the client device to support a messaging protocol. Additionally, the techniques of the disclosure enable a router to cause a client device to reestablish a session in the event of a path failure without the excessive delay of waiting for a TCP session timeout or waiting for an administrator to reestablish an IPSec tunnel, which may result in blackholing traffic. Furthermore, the techniques of the disclosure enable a router to failover a path-specific, stateful routing session from a first path to a second path, even where different NAT services are applied to the first path and second path. The techniques of the disclosure further enable a router to move a session between a client and a server from a first path to a second path where the second path provides better performance or has a higher priority than the first path. Additionally, the techniques of the disclosure do not interfere with the forwarding of traffic where no NAT services are applied to the traffic.

In one example, this disclosure describes a method comprising: forwarding, by a router and along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the forwarding comprises forwarding each packet of the first plurality of packets in order along the same first path, determining, by the router, that the first path should not be used for the first stateful routing session; in response to the determination, forwarding, by the router and along a second path, at least one packet of the first forward packet flow of the first stateful routing session, wherein forwarding the at least one packet along the second path causes the destination device to reject the at least one packet, the rejection causing the source device to establish a second stateful routing session between the source device and the destination device, and forwarding, by the router and along the second path, a second plurality of packets of a second forward packet flow of the second stateful routing session, wherein the second stateful routing session comprises the second forward packet flow and a second reverse packet flow between the source device and the destination device, and wherein the forwarding comprises forwarding each packet of the second plurality of packets in order along the same second path.

In another example, this disclosure describes a router comprising processing circuitry configured to: forward, along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the processing circuitry is configured to forward each packet of the first plurality of packets in order along the same first path, determine that the first path should not be used for the first stateful routing session; in response to the determination, forward, along a second path, at least one packet of the first forward packet flow of the first session, wherein the processing circuitry is configured to forward the at least one packet along the second path, which causes the destination device to reject the at least one packet, the rejection configured to cause the source device to establish a second stateful routing session between the source device and the destination device, and forward, along the second path, a second plurality of packets of a second forward packet flow of the second stateful routing session, wherein the second stateful routing session comprises the second forward packet flow and a second reverse packet flow between the source device and the destination device, and wherein the processing circuitry is configured to forward each packet of the second plurality of packets in order along the same second path.

In another example, this disclosure describes a non-transitory, computer-readable medium comprising instructions that, when executed, are configured to cause processing circuitry of a router to: forward, along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the processing circuitry is configured to forward each packet of the first plurality of packets in order along the same first path, determine that the first path should not be used for the first stateful routing session; in response to the determination, forward, along a second path, at least one packet of the first forward packet flow of the first session, wherein the processing circuitry is configured to forward the at least one packet along the second path, which causes the destination device to reject the at least one packet, the rejection configured to cause the source device to establish a second stateful routing session between the source device and the destination device, and forward, along the second path, a second plurality of packets of a second forward packet flow of the second stateful routing session, wherein the second stateful routing session comprises the second forward packet flow and a second reverse packet flow between the source device and the destination device, and wherein the processing circuitry is configured to forward each packet of the second plurality of packets in order along the same second path.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
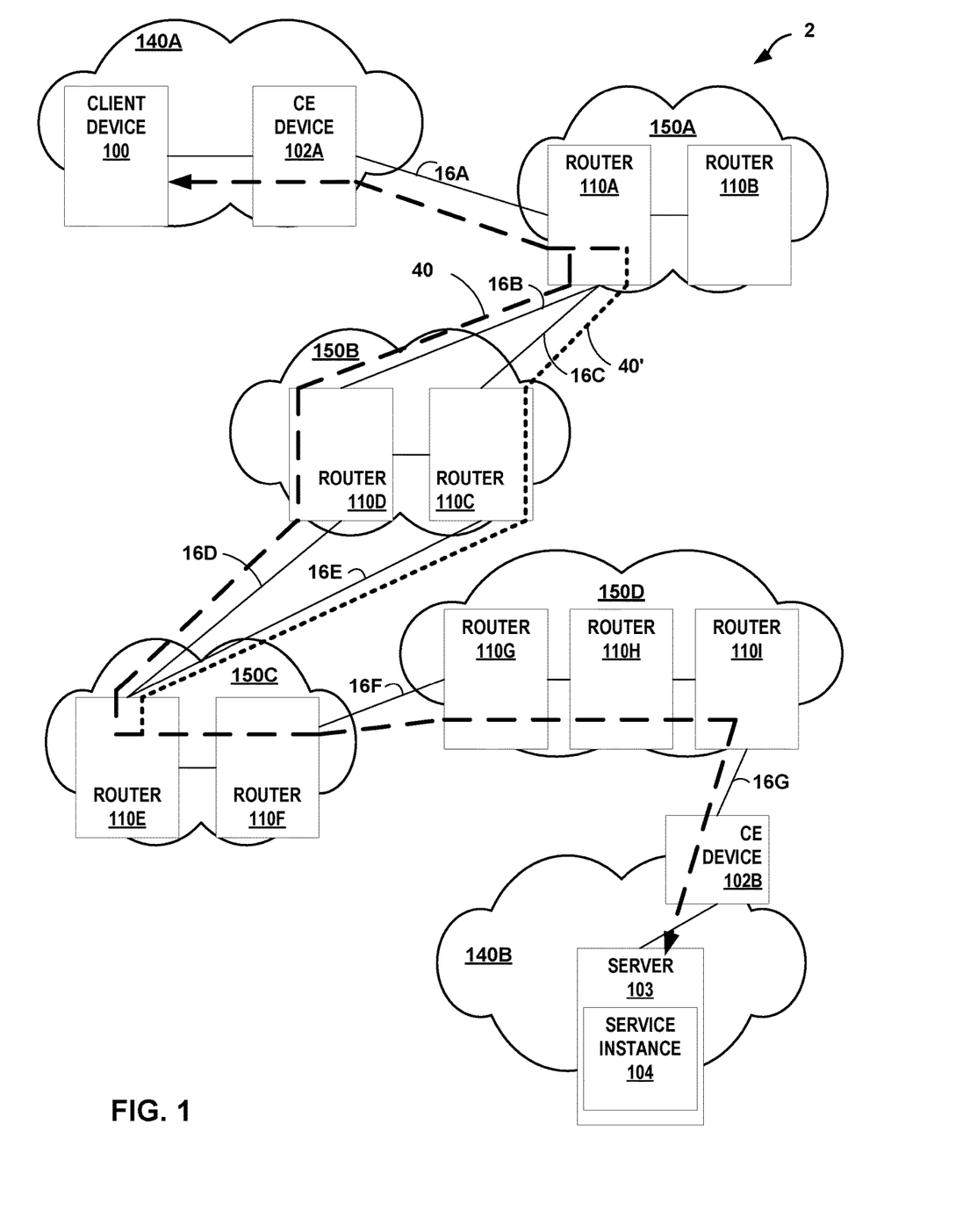
FIG. 1 is a block diagram illustrating an example computer network system in accordance with the techniques of the disclosure.

FIG. 1 is a block diagram illustrating example computer network system 2 in accordance with the techniques of the disclosure. In the example of FIG. 1, computer network system 2 includes service provider networks 150A-150D (collectively, "service provider networks 150") configured to provide Wide Area Network WAN) connectivity to disparate customer networks 140A-140B ("customer networks 140"). Routers 110A-110I (collectively, "routers 110") of service provider networks 150 provide client device 100 and server 103 associated with customer networks 140 with access to service provider networks 150 via customer edge devices 102A-102B (collectively, "CE devices 102"). In some examples, customer network 140A is an enterprise network. In some examples, customer network 140B is a cloud service provider (CSP) network that provides a network service to client device 100 in the form of service instance 104 hosted by server 103. Customer network 140A is depicted as having a single client device 100 for ease of illustration. Typically, customer network 140A includes many client devices 100, each of which may access CSP network 140B to access one or more network services. Communication links 16A-16G (collectively, links "16") may be Ethernet, ATM or any other suitable network connections.

CE devices 102 and routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large Layer-Three (L3) computer network, where reference to a layer followed by a number refers to a corresponding layer in the Open Systems Interconnection (OSI) model. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and destination devices 103, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100 of system 2 establishes session 40 with service instance 104. Routers 110 facilitate establishment of session 40 by transporting network traffic between client device 100 and service instance 104. In some examples, client device 100 may be considered a "source" device in that client device 100 originates sessions 40 between client device 100 and service instance 104, e.g., client device 100 is the "source" of the first packet of the forward flow of the session. Session 40 includes a forward packet flow originating from client device 100 and destined for service instance 104 hosted by server 103 and a reverse packet flow originating from service instance 104 and destined for client device 100. A forward flow for session 40 traverses a first path including, e.g., client device 100, CE device 102A, routers 110A, 110D, and 110E-110I, CE device 102B, and server 103. As described in more detail below, routers 110 may dynamically select a second path over which to forward network traffic for session 40 (represented in FIG. 1 as session 40'). A forward flow for session 40' traverses the second path, which includes, e.g., client device 100, CE device 102A, routers 110A, 110C, and 110E-110I, CE device 102B, and server 103. As depicted in the example of FIG. 1, at least a portion of the first path and second path are the same (e.g., first and second paths both include routers 110A and 110E-110I). However, the first and second paths diverge in that the first path traverses router 110D, while the second path traverses router 110C.

Client device 100 may establish session 40 according to one or more communication session protocols including TCP, TLS, UDP, or ICMP, etc. For example, to establish session 40 according to TCP such that data may be exchanged according to TCP, client device 100 and service instance 104 perform a three-way handshake. Client device 100 sends a first packet comprising a "SYN" flag to service instance 104. Service instance 104 acknowledges receipt of the first packet by responding to client device 100 with a second packet comprising a "SYN-ACK" flag. Client device 100 acknowledges receipt of the second packet by responding to service instance 104 with a third packet comprising an "ACK" flag. After sending the third packet, session 40 is established according to TCP and client device 100 and service instance 104 may exchange data with one another via session 40. Additional information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference. Additional information regarding TLS is described in "The Transport Layer Security (TLS) Protocol Version 1.2," RFC 5246, IETF, August 2008, available at https://tools.ietf.org/html/rfc5246; and "The Transport Layer Security (TLS) Protocol Version 1.3," RFC 8446, IETF, August 2018, available at https://tools.ietf.org/html/rfc8446, the entire contents of each of which are incorporated herein by reference. Additional information regarding UDP is described in "User Datagram Protocol," RFC 768, IETF, Aug. 28, 1980, available at https://tools.ietf.org/html/rfc768, the entire contents of which are incorporated herein by reference. Additional information regarding ICMP is described in "INTERNET CONTROL MESSAGE PROTOCOL," RFC 792, IETF, September 1981, available at https://tools.ietf.org/html/rfc792, the entire contents of which are incorporated herein by reference.

In the example of FIG. 1, when router 110A receives a packet for the forward packet flow originating from client device 100 and destined for server 103, router 110A determines whether the packet belongs to a new session (e.g., is the "first" packet or "lead" packet of session 40). In some examples, router 110A determines whether a source address, source port, destination address, destination port, and/or protocol of the first packet matches an entry in session information stored by router 110A.

If no such entry exists, router 110A determines that the packet belongs to a new session and creates an entry in the session information. Furthermore, if the packet belongs to a new session, router 110A may generate a session identifier for session 40. The session identifier may comprise, e.g., a source address and source port of client device 100, a destination address and destination port of server 103, and a protocol used by the first packet. Router 110A may use the session identifier to identify subsequent packets as belonging to the same session.

In some examples, routers 110 perform stateful routing for session 40. This means that routers 110 forward each packet of the forward packet flow of session 40 sequentially and along the same forward network path. As described herein, the "same" forward path means the same routers 110 that form a segment or at least a portion of a network path between a device originating the packet and a device to which the packet is destined (and not necessarily the entire network path between the device originating the packet and the device to which the packet is destined). Further, routers 110 forward each packet of the reverse flow of session 40 sequentially and along the same reverse network path. The forward network path for the forward packet flow of session 40 and the reverse network path of the reverse flow of session 40 may be the same path, or different paths. Each of routers 110 along the path may forward each packet of the forward packet flow sequentially and along the same path, thereby enabling the use of stateful packet services, such as Deep Packet Inspection (DPI) or stateful firewall services.

In the example of FIG. 1, a stateful routing session may be established from ingress router 110A through one or more of intermediate routers 110C-110H to egress router 110I. In this example, router 110A determines that the first packet is an unmodified packet and the first packet of new session 40. Router 110A modifies the first packet to include metadata specifying the session identifier (e.g., the original source address, source port, destination address, destination port, and/or protocol) and/or other policy and control parameters. Router 110A replaces the header of the modified first packet to specify a source address that is an address of router 110A, a source port that is a port via which router 110A forwards the modified first packet toward server 103, a destination address that is an address of the next hop to which router 110A forwards the first packet (e.g., an address of router 110D), and a destination port that is a port of the next hop to which router 110A forwards the first packet (e.g., a port of router 110D). Additionally, router 110A stores the session identifier for session 40 and an indication of the selected next hop for session 40 (e.g., router 110D) such that, upon receiving subsequent packets for session 40, router 110A may identify the subsequent packets as belonging to the same session 40 and forward the subsequent packets along the same path as the first packet without modification to include the metadata.

Router 110A may further identify a network service associated with session 40. For example, router 110A may compare one or more of a source address, source port, destination address, or destination port for the session to service information of router 110A that includes service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to service instance 104 of server 103, which is an instance of a particular network service. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of addresses or ports indicative that a particular service is associated with session 40.

In some examples, router 110A uses the determined network service for session 40 to select a forward path for forwarding the first packet and each subsequent packet of the forward packet flow of session 40 toward server 103. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110D. Intermediate router 110D receives the modified first packet and determines whether the modified first packet includes metadata specifying the session identifier. In response to determining that the modified first packet includes metadata specifying the session identifier, intermediate router 110D determines that router 110D is not an ingress device such that router 110D does not attach metadata specifying the session identifier.

As described above with respect to router 110A, router 110D determines whether the packet belongs to a new session (e.g., is the "first" packet or "lead" packet of the session) by determining whether a source address, source port, destination address, destination port, and protocol of the first packet matches an entry in session information stored by router 110D. If no such entry exists, router 110D determines that the packet belongs to a new session and creates an entry in the session information of router 110D. Furthermore, if the packet belongs to a new session, router 110D generates a session identifier for the session. The session identifier used by router 110D to identify the session for the first packet may be different from the session identifier used by router 110A to identify the same session for the first packet, because each router 110A, 110D uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session. Router 110D may store the session identifier for the session and an indication of a selected next hop for the session (e.g., router 110E) such that, upon receiving subsequent packets for the session, router 110D may identify subsequent packets as belonging to the same session and forward the subsequent packets along the same path as the first packet, without modification to include the metadata.

Router 110D replaces the header of the modified first packet to specify a source address that is an address of router 110D, a source port that is a port via which router 110D forwards the modified first packet toward server 103, a destination address that is an address of the next hop to which router 110D forwards the first packet (e.g., an address of router 110E for session 40 along the first path), and a destination port that is a port of the next hop to which router 110D forwards the first packet (e.g., a port of router 110E). Router 110D forwards the modified first packet to router 110D.

Subsequent intermediate routers 110E-110H process the modified first packet in a similar fashion as routers 110A and 110D such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to CE device 102B for forwarding to server 103. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., server 103 via CE device 102B). Router 110I recovers the original first packet by removing the metadata from the modified first packet and using the metadata to modify the header of the first packet to specify the original source address, source port, destination address, and destination port. Router 110I forwards the recovered first packet to CE device 102B for forwarding to server 103. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with a Software License Agreement (SLA) requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Session Reestablishment Using Path Change.

In accordance with the techniques of the disclosure, one of routers 110, such as router 110A, may cause client device 100 (e.g., a source device) to establish a second stateful routing session 40' with server 103 (e.g., a destination device) by changing, by the router 110, a network path over which network traffic associated with first stateful routing session 40 is forwarded. The example of FIG. 1 is described with respect to, e.g., ingress router 110A. However, the techniques of the disclosure may be performed by any of routers 110, such as intermediary router 110D or egress router 110I.

As described above, a source device, such as client device 100, establishes a first stateful routing session 40 with a destination device, such as server 103. First stateful routing session 40 includes a first forward packet flow originating from client device 100 and destined for server 103 and a first reverse packet flow originating from server 103 and destined for client device 100.

Client device 100 transmits a first plurality of packets of the first forward packet flow of first stateful routing session 40 to a next hop, e.g., CE device 102A. CE device 102A forwards the first plurality of packets to router 110A. Router 110A receives the first plurality of packets via an ingress interface and forwards the first plurality of packets of the first packet flow toward server 103 along a first path via a first egress interface. With respect to FIG. 1, the first path includes, e.g., client device 100, CE device 102A, routers 110A, 110D, and 110E-110I, CE device 102B, and server 103.

Each router 110 along the first path performs stateful routing of first stateful routing session 40. For example, each router 110 forwards each packet of the first forward packet flow, in order, to a same next hop along the same forward path and forwards each packet of the first reverse packet flow, in order, to a same next hop along the same reverse path. However, the forward path of the first forward packet flow and the reverse path of the first reverse packet flow may be the same path or different paths. With respect to the example of FIG. 1, router 110A forwards each packet of the first forward packet flow, in order, along the same first path toward server 103. Each router 110 along the first path forwards the first plurality of packets of the first packet flow toward server 103, and server 103 receives the first plurality of packets.

In the event of a failure in the first path, such as a failure of one of links 16B, 16D, 16F, or routers 110D-110I, session 40 between client device 100 and server 103 may timeout. After timeout occurs, client device 110 may terminate session 40, establish a new session, and resume exchanging network traffic with server 103 via the new session. Where session 40 is a TCP session, this timeout may take a considerable amount of time to occur, and client device 100 may need to resend any traffic sent during the time between the failure of the first path and session timeout of session 40. Additionally, where session 40 is carried through an IPsec tunnel, timeout may never occur because the IPsec tunnel may carry traffic for other sessions. The traffic for other sessions may prevent timeout of the IPsec tunnel, thereby causing blackholing of traffic for session 40. This blackholing may continue until an administrator reestablishes the IPsec tunnel. Even if a conventional router were to detect such a failure in the first path, existing techniques do not provide a mechanism for such a conventional router to signal client device 100 of the failure such that client device 100 may reestablish session 40 and avoid waiting for session 40 to timeout.

In accordance with the techniques of the disclosure, router 110A causes client device 100 (e.g., a source device) to establish a second stateful routing session. 40' with server 103 (e.g., a destination device) by changing, by the router 110, a network path over which network traffic associated with first stateful routing session 40 is forwarded. In some examples, router 110A determines that the first path should not be used for first stateful routing session 40. For example, router 110A determines that the first path should not be used for first stateful routing session 40 in response to detecting a failure in the first path. In some examples, the failure in the first path may be due to a device (e.g., such as router 110D) or link along the first path (e.g., such as link 16D). Router 110A may use various different types of link status monitoring protocols to detect the failure in the first path. For example, router 110A may use Bidirectional Forwarding Detection (BFD) to detect the failure in the first path. Additional information regarding BFD is described in "Bidirectional Forwarding Detection (BFD)," Request for Comments (RFC) 5880, Internet Engineering Task Force (IETF), June 2010, available at https://datatracker.ietf.org/doc/html/rfc5880, the entire contents of which are incorporated herein by reference.

In another example, router 110A determines that the first path should not be used for first stateful routing session 40 in response to determining that a second path provides higher performance than the first path or in response to determining that the second path has a higher priority than the first path, etc. For example, router 110A may implement one or more measurement protocols, such as One-Way Active Measurement Protocol (OWAMP), Two-Way Active Measurement Protocol (TWAMP), Internet Control Messaging Protocol (ICMP), and/or ping of TCP/UDP, etc., and determines the second path provides higher performance than the first path. In some examples, router 110A may determine the second path has a higher priority than the first path.

In some examples, router 110A may determine that a first path across a broadband network should not be used and instead use a second path across an Long-Term Evolution (LTE) wireless network, or vice versa. In some examples, router 110A may determine that one or more routers 110 along the first path (e.g., such as router 110D) perform session-based routing of network traffic should not be used, and instead should use one or more routers 110 along the second path (e.g., such as router 110C) that do not perform session-based routing of the network traffic, or vice versa.

In response to the determination that the first path should not be used for first stateful routing session 40, router 110A forwards at least one packet of the first forward packet flow of first stateful routing session 40 along a second path. With respect to the example of FIG. 1, the second path includes, e.g., client device 100, CE device 102A, routers 110A, 110C, and 110E-110I, CE device 102B, and server 103. Each router 110 along the second path forwards the at least one packet of the first packet flow toward server 103, and server 103 receives the at least one packet. Service instance 104 recognizes the change from use of the first path to use of the second path. Typically, when service instance 104 detects a path change for session 40, service instance 104 requires client device 100 to establish a new session. Therefore, by forwarding the at least one packet along the second path, router 110A may cause server 103 (via service instance 104) to reject the at least one packet, thereby causing client device 100 to terminate stateful routing session 40 and establish new stateful routing session 40'.

In some examples, a first NAT service along the first path may be applied to network traffic forwarded along the first path, while a second NAT service along the second path may be applied to network traffic forward along the second path. In some examples, a first egress interface of router 110A is associated with the first path, and a second egress interface of router 110A is associated with the second path. In this example, router 110A may apply the first NAT service to packets forwarded via the first egress interface along the first path, and may further apply the second NAT service to packets forwarded via the second egress interface along the second path. In another example, other routers may provide the first and second NAT services. For example, router 110D may apply the first NAT service to packets forwarded by router 110D, while router 110C may apply the second NAT service to packets forwarded by router 110C.

Therefore, as router 110A forwards the plurality of packets of the first forward packet flow of session 40 along the first path, the first NAT service is applied to the plurality of packets such that server 103 receives packets to which the first NAT service is applied. Moreover, the packets to which the first NAT service is applied may have a header specifying a source address and a source port associated with the first NAT service instead of client device 100.

In contrast, when router 110A forwards the at least one packet along the second path, the second NAT service is applied to the at least one packet instead of the first NAT service. When server 103 receives the at least one packet to which the second NAT service has been applied, the at least one packet may have a header specifying a source address and a source port associated with the second NAT service instead of client device 100. Server 103 may not recognize the at least one packet as belonging to first stateful routing session 40, causing server 103 to reject the at least one packet. That is, the application of the second NAT service to the at least one packet may cause server 103 to receive a packet with a 5-tuple header for which server 103 does not have an associated session stored. This causes server 103 to reject the at least one packet.

In response to the rejection of the at least one packet by server 103, client device 100 terminates first stateful routing session 40 and establishes new stateful routing session 40'. Second stateful routing session 40' includes a second forward packet flow originating from client device 100 and destined for server 103 and a second reverse packet flow originating from server 103 and destined for client device 100. Client device 100 transmits a second plurality of packets of the second forward packet flow of second stateful routing session 40' to a next hop, e.g., CE device 102A, which in turn forwards the second plurality of packets to router 110A to forward the packets along the second path of the second packet flow.

In some examples, stateful routing session 40 may be carried via an IPsec tunnel. In these examples, the at least one packet forwarded along the second path may not conform to a negotiated authentication procedure established between client device 100 and server 103 for the IPsec tunnel. For example, the application of the second NAT service may alter an encryption of the at least one packet such that server 103 rejects the at least one packet as not authentic. In response to receiving the at least one packet, server 103 may reject the packet and request that client device 100 renegotiate the authentication and/or encryption parameters used for communication between client device 100 and server 103. This may have the effect of causing client device 100 to terminate first stateful routing session 40 and establish a second stateful routing session 40' with server 103. For example, where session 40 is transported via a first IPSec tunnel, client device 100 may terminate the first IPSec tunnel and establish a second IPSec tunnel for forwarding network traffic of second stateful routing session 40'.

As another example, stateful routing session 40 may be a TCP session. In this example, when server 103 receives the plurality of packets of the forward packet flow, the source address of the plurality of packets may be based on the application of the first NAT service. When server 103 receives the at least one packet forwarded along the second path, the source address of the at least one packet may be based on the application of the second NAT service such that the source address of the at least one packet is different than the source address of the plurality of packets of the forward packet flow. Accordingly, server 103 may not recognize an origin of the at least one packet, causing server 103 to reject the at least one packet and transmit a TCP reset message to client device 100 to close session 40. In response to the TCP reset message, client device 100 terminates first stateful routing session 40 and establishes new stateful routing session 40' as a second TCP session.

Router 110A may ensure that traffic of session 40' is forwarded along the second path and not the first path, e.g., by using the session-based routing techniques described above to select the second path for transporting network traffic associated with second stateful routing session 40' when receiving a lead packet for session 40'. In this fashion, router 110A may indirectly cause client device 100 to terminate first stateful routing session 40 and establish a new stateful routing session 40' with server 103 without waiting for session 40 to timeout in response to the failure in the first path.

Router 110A receives the second plurality of packets via the ingress interface and forwards, via a second egress interface, the second plurality of packets of the second packet flow toward server 103 along the second path instead of the first path. As described above, in some examples, the first path may include the use of a first egress interface of router 110A, while the second path may include the use of a second egress interface of router 110A. For example, the first path may include at least one interface of router 110A that is different from at least one interface of router 110A included within the second path. As another example, the first path may include at least one router 110 that is different from at least one router that is included within the second path.

Each router 110 along the second path performs stateful routing of second stateful routing session 40'. For example, each router 110 along the second path forward each packet of the second forward packet flow, in order, to a same next hop along the same forward path and forwards each packet of the second reverse packet flow in order to a same next hop along the same reverse path. The forward path of the second forward packet flow and the reverse path of the second reverse packet flow may be the same path or different paths. With respect to the example of FIG. 1, router 110A forwards each packet of the second forward packet flow, in order, along the same second path toward server 103. Each router 110 along the second path forwards the second plurality of packets of the second packet flow toward server 103, and server 103 receives the second plurality of packets.

In some examples where router 110A performs stateful routing (e.g., a local breakout session), router 110A assigns a path index for each path associated with a service (e.g., a service path). Router 110A monitors one or more SLA requirements for the service. If one or more performance requirements of a path fail to satisfy the one or more SLA requirements for the service, or if the path is down, router 110A generates a notification that the path does not satisfy requirements for the service. Additionally, router 110A may use the techniques disclosed above to move the existing session to use of a new path. Therefore, a router as described herein may move traffic on a per-session basis, thereby enabling the migration of only traffic associated with sessions for which a path does not meet SLA requirements, while preserving traffic associated with sessions for which the path meets SLA requirements.

Figure 2:
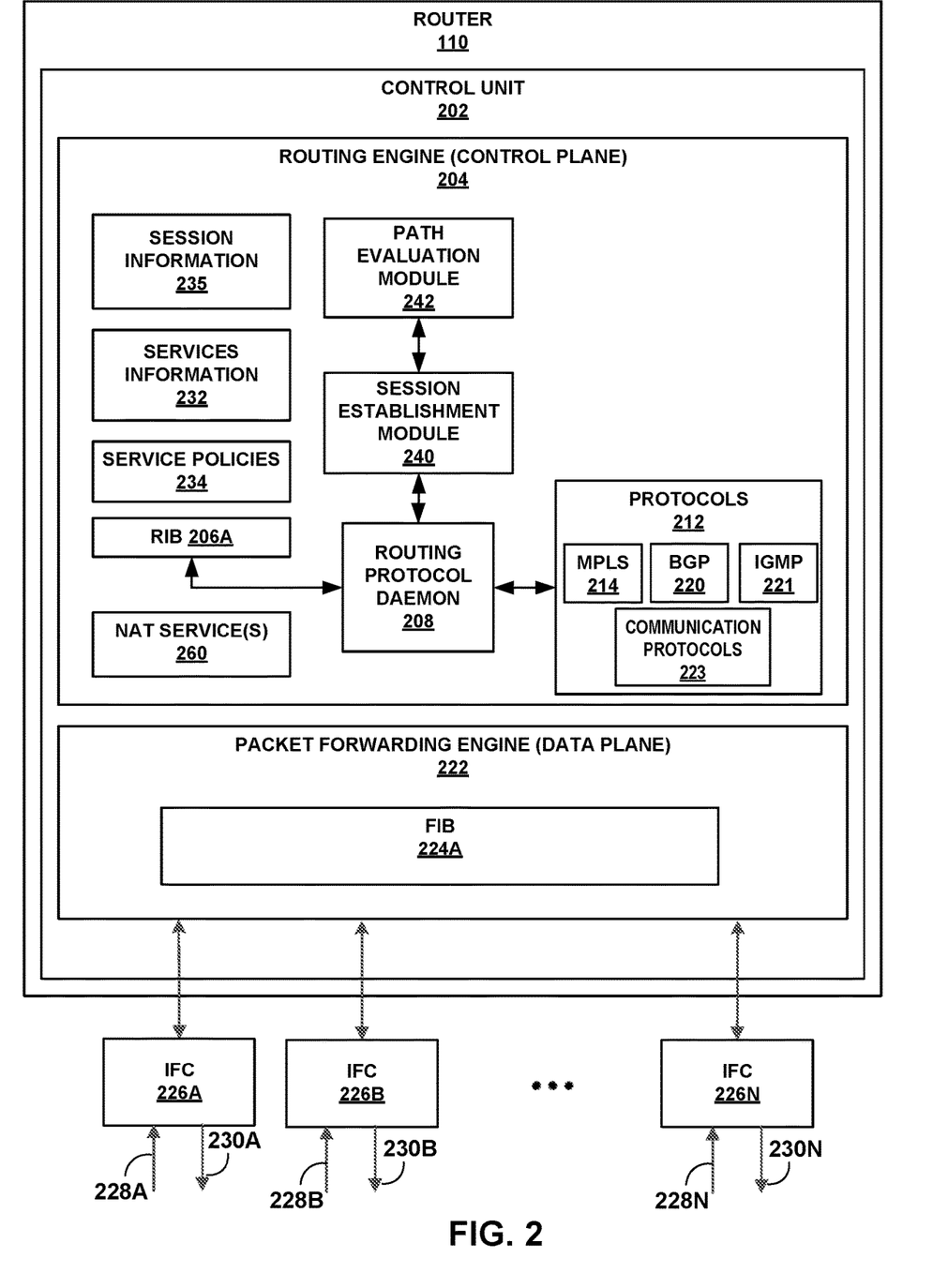
FIG. 2 is a block diagram illustrating an example router in accordance with the techniques of the disclosure.

FIG. 2 is a block diagram illustrating example router 110 in accordance with the techniques of the disclosure. In general, router 110 may be an example of one of routers 110 of FIG. 1. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIG. 1, to establish and maintain a computer network, such as computer network system 2 of FIG. 1, for transporting network traffic between one or more customer devices. Routing protocol daemon (RPD) 208 of routing engine 204 executes software instructions to implement one or more control plane networking protocols 212. For example, protocols 212 may include one or more routing protocols, such as Border Gateway Protocol (BGP) 220, for exchanging routing information with other routing devices and for updating routing information base (RIB) 206, Multiprotocol Label Switching (MPLS) protocol 214, and Internet Group Management Protocol (IGMP) 221. Protocols 212 may further include one or more communication protocols, such as TCP, UDP, TLS, or ICMP. Protocols 212 may also include fault detection protocols, such as BFD. Protocols 212 may further include measurement protocols, such as ping (e.g., TCP ping), traceroute (e.g., ICMP traceroute), OWAMP, TWAMP, etc.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100 and destined for server 103 of FIG. 1, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. For example, services information 232 comprises one or more entries that specify a service identifier and one or more of a source address, source port, destination address, destination port, or protocol associated the service. In some examples, routing engine 204 may perform a lookup of services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

In some examples, control unit 202 provides one or more NAT service(s) 260. NAT is a process where a network device, such as router 110, maps a first IP address space to a second IP address space. Typically, control unit 202 may implement NAT by modifying IP address information in an IP header of a packet received from a source device within a first network prior to forwarding the packet toward a destination device within a second network. As an example, control unit 202 may apply NAT services to traffic routed between client device 100 within first customer network 140A and server 103 within second customer network 140B. In some examples, client device 100 is assigned a private address within customer network 140A. Control unit 202 receives a packet from client device 100 and translates the private address of client device 100 specified in a header of the packet to a common, external-facing address for customer network 140A prior to forwarding the packet to customer network 140B. Control unit 202 may track information about session 40 between client device 100 and server 103 to enable control unit 202 to receive a reverse packet from server 103 comprising a header specifying the external-facing address for customer network 140A, translate the external-facing address for customer network 140A to the private address for client device 100, and forward the packet to client device 100. Therefore, control unit 202 may use NAT to obfuscate a private address of a client device 100 within first customer network 140A from devices of second customer network 140B. Additionally, NAT may be used to avoid assigning new addresses to each computing device within first customer network 140A if the public address of first customer network 140A is changed. NAT may also be used to conserve the global address space of Internet Protocol version 4 (IPv4) addresses such that only each subdomain (e.g., private network or group of private networks) may require a unique external IP address, rather than requiring every device to have a unique external IP address.

In some examples, control unit 202 may provide multiple NAT services. For example, control unit 202 may associate a different NAT service with each IFC 226 such that control unit 202 may apply a first NAT service to first network traffic prior to forwarding the first network traffic via first IFC 226A and a second NAT service to second network traffic prior to forwarding the second network traffic via second IFC 226B. In some examples, the first NAT service may map an IP address and port of client device 100 and/or CE device 102A to a first IP address and port assigned to IFC 226A, and the second NAT service may map the same IP address and port of client device 100 and/or CE device 102A to a second IP address and port assigned to IFC 226B that is different than the first IP address and port assigned to IFC 226A.

In one example, control unit 202 receives, via IFCs 226, a first plurality of packets of a first forward flow of first stateful routing session 40 between a source device and a destination device. With respect to the example of FIG. 1, the source device is client device 100 and the destination device is server 103. First stateful routing session 40 includes a first forward packet flow originating from client device 100 and destined for server 103 and a first reverse packet flow originating from server 103 and destined for client device 100.

Control unit 202 performs stateful routing of first stateful routing session 40. For example, routing engine 204 may program packet forwarding engine 222 to forward each packet of the first plurality of packets of the first forward flow in order to a same next hop along the same forward path and forward each packet of the reverse packet flow in order to a same next hop along the same reverse path. In some examples, the forward path of the forward packet flow and the reverse path of the reverse flow may be the same path or different paths. In this example, with respect to FIG. 1, routing engine 204 applies a first NAT service 260 to each packet of the first plurality of packets of the first forward flow and programs packet forwarding engine 222 to forward, via IFC 226A, each packet of the first plurality of packets of the first forward flow, in order, to a same next hop along a first path that includes, e.g., client device 100, CE device 102A, routers 110A, 110D, and 110E-110I, CE device 102B, and server 103.

Path evaluation module 242 determines that the first path should not be used for first stateful routing session 40. For example, path evaluation module 242 determines that the first path should not be used for first stateful routing session 40 in response to detecting a failure in the first path. In some examples, path evaluation module 242 may execute software instructions to implement BFD or other failure detection mechanisms to detect failure in the first path. In another example, path evaluation module 242 determines that the first path should not be used for first stateful routing session 40 in response to determining that a second path provides higher performance than the first path or the second path has a higher priority than the first path, etc. For example, path evaluation module 242 may execute software instructions to implement one or more measurement protocols, such as OWAMP, TWAMP, ICMP echo, TCP/UDP ping, or other measurement protocols or mechanisms to measure performance metrics such as latency, jitter, packet loss, and/or other performance metrics of the paths.

In response to the determination by path evaluation module 242 that the first path should not be used for first stateful routing session 40, session establishment module 240 determines that client device 100 should terminate stateful routing session 40 and establish a new stateful routing session 40' for exchanging traffic with server 103. For example, based on the determination that the first path should not be used for first stateful routing session 40, session establishment module 240 causes routing engine 204 to program packet forwarding engine 222 to forward at least one packet of the first forward packet flow of first stateful routing session 40 along a second path (e.g., with respect to the example of FIG. 1, the second path includes, e.g., client device 100, CE device 102A, routers 110A, 110C, and 110E-110I, CE device 102B, and server 103). With respect to the foregoing example, packet forwarding engine 222 is programmed to forward packets of the first forward packet flow via IFC 226A. Session establishment module 240 may program packet forwarding engine 222 to forward the at least one packet of the first forward packet flow via IFC 226B. Routing engine 204 applies a second NAT service 260 to the at least one packet and packet forwarding engine 222 forwards, via IFC 226B, the at least one packet to a next hop along the second path.

Server 103 of FIG. 1 may detect the change from forwarding packets of session 40 along the first path to forwarding the at least one packet of session 40 along the second path. In response to detecting the path change, server 103 rejects the packet. The rejection of the at least one packet by server 103 causes client device 100 of FIG. 1 to establish a second stateful routing session 40' with server 103. Second stateful routing session 40' includes a second forward packet flow originating from client device 100 and destined for server 103 and a second reverse packet flow originating from server 103 and destined for client device 100.

Control unit 202 receives, via IFCs 226, a second plurality of packets of the second forward flow of second stateful routing session 40'. Control unit 202 performs stateful routing of second stateful routing session 40'. For example, routing engine 204 may program packet forwarding engine 222 to forward each packet of the second plurality of packets of the second forward flow in order to a same next hop along the same forward path and forward each packet of the second reverse packet flow in order to a same next hop along the same reverse path. In some examples, the forward path of the forward packet flow and the reverse path of the reverse flow may be the same path or different paths. In this example, with respect to FIG. 1, routing engine 204 applies a second NAT service 260 to each packet of the second plurality of packets of the second forward flow and programs packet forwarding engine 222 to forward, via IFC 226B, each packet of the second plurality of packets of the second forward flow in order to a same next hop along the second path.

Accordingly, the rejection of the at least one packet by server 103 causes client device 100 to establish second stateful routing session 40'. Routing engine 204 programs packet forwarding engine 222 to forward packets of the second forward flow of second stateful routing session 40' along the second path and not the first path. Therefore, using the techniques described above, control unit 202 may cause server 103 to reject at least one packet of session 40 by changing a path over which packet forwarding engine 222 forwards the at least one packet, which may indirectly cause client device 100 to terminate session 40 and establish a new stateful routing session 40' with server 103. Accordingly, a router as described herein may avoid requiring client 100 to wait for a full amount of time required for first stateful routing session 40 to timeout upon a failure in the first path.

In the foregoing example, control unit 202 operates as router 110A of FIG. 1 and applies the first NAT service and second NAT service to packets of session 40. However, in other examples not expressly described herein, other routers 110, such as routers 110D and 110C may apply the first NAT service and second NAT service respectively. In this example, router 110A may nonetheless cause client device 100 to terminate first stateful routing session 40 and establish new stateful routing session 40' by forwarding the at least one packet along the second path, such that router 110C applies the second NAT service to the at least one packet, thereby causing server 103 to reject the at least one packet because the second NAT service and not the first NAT service has been applied to the at least one packet.

Figure 3:
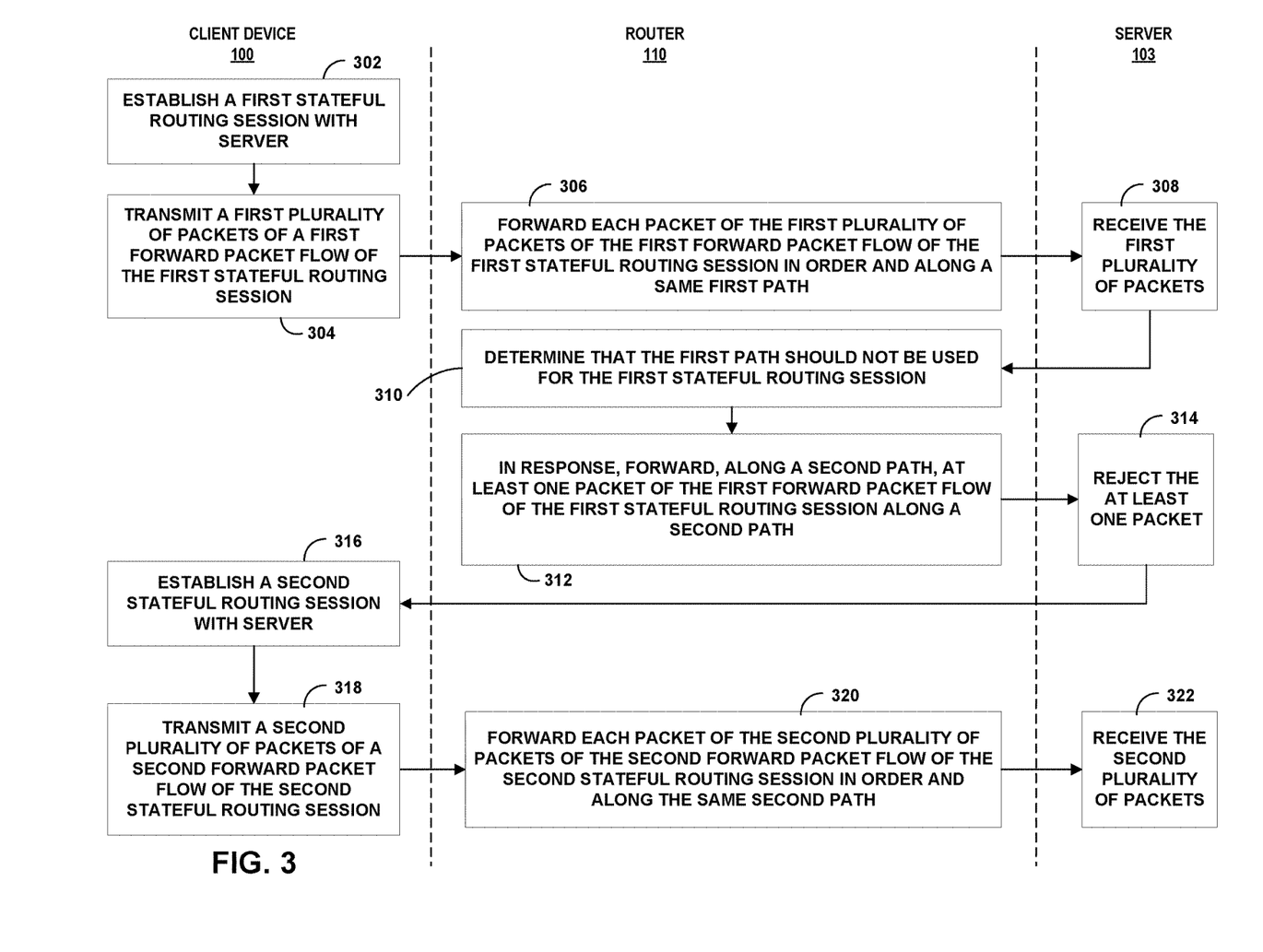
FIG. 3 is a flowchart illustrating an example operation in accordance with the techniques of the disclosure.

FIG. 3 is a flowchart illustrating an example operation in accordance with the techniques of the disclosure. FIG. 3 is described with respect to FIGS. 1 and 2 for convenience.

As depicted in the example of FIG. 3, a source device, such as client device 100, establishes a first stateful routing session 40 with a destination device, such as server 103 (302). First stateful routing session 40 includes a first forward packet flow originating from client device 100 and destined for server 103 and a first reverse packet flow originating from server 103 and destined for client device 100.

Client device 100 transmits a first plurality of packets of the first forward packet flow of first stateful routing session 40 to a next hop, e.g., CE device 102A (304). CE device 102A forwards the first plurality of packets to router 110A. Router 110A forwards the first plurality of packets of the first packet flow toward server 103 along a first path (306). With respect to FIG. 1, the first path includes, e.g., client device 100, CE device 102A, routers 110A, 110D, and 110E-110I, CE device 102B, and server 103.

Router 110A performs stateful routing of first stateful routing session 40. For example, router 110A forwards each packet of the first forward packet flow in order to a same next hop along the same forward path and forwards each packet of the reverse packet flow in order to a same next hop along the same reverse path. However, the forward path of the forward packet flow and the reverse path of the reverse flow may be the same path or different paths. With respect to the example of FIG. 1, router 110A forwards each packet of the first forward packet flow in order along the same first path toward server 103. Each router 110 along the first path forwards the first plurality of packets of the first packet flow toward server 103, and server 103 receives the first plurality of packets (308).

In some circumstances, one of routers 110, such as router 110A, determines that the first path should not be used for first stateful routing session 40 (310). For example, router 110A determines that the first path should not be used for first stateful routing session 40 in response to detecting a failure in the first path. In some examples, the failure in the first path may be due to a device (e.g., such as router 110D) or link along the first path (e.g., such as link 16D). In another example, router 110A determines that the first path should not be used for first stateful routing session 40 in response to determining that a second path provides higher performance than the first path or the second path has a higher priority than the first path, etc. With respect to the example of FIG. 1, the second path includes, e.g., client device 100, CE device 102A, routers 110A, 110C, and 110E-110I, CE device 102B, and server 103.

In response to the determination that the first path should not be used for first stateful routing session 40, router 110A forwards at least one packet of the first forward packet flow of first stateful routing session 40 along the second path (312). Each router 110 along the second path forwards the at least one packet of the first packet flow toward server 103, and server 103 receives the at least one packet. However, by forwarding the at least one packet of the first forward packet flow along the second path instead of the first path, router 110A causes server 103 to reject the packet (314).

The rejection of the at least one packet causes client device 100 to establish a second stateful routing session 40' with server 103 (316). Second stateful routing session 40' includes a second forward packet flow originating from client device 100 and destined for server 103 and a second reverse packet flow originating from server 103 and destined for client device 100. Client device 100 transmits a second plurality of packets of the second forward packet flow of second stateful routing session 40' to a next hop, e.g., CE device 102A (318). CE device 102A forwards the second plurality of packets to router 110A. Router 110A forwards the second plurality of packets of the second packet flow toward server 103 along the second path instead of the first path (320). As described above, in some examples, the first path may include the use of a first egress interface of router 110A, while the second path may include the use of a second egress interface of router 110A. As another example, the first path may include at least one router 110 that is different from at least one router that is included within the second path.

Additionally, router 110A forwards each packet of the second forward packet flow in order along the same forward path and forwarding each packet of the reverse packet flow in order along the same reverse path. However, the forward path of the forward packet flow and the reverse path of the reverse flow may be the same path or different paths. With respect to the example of FIG. 1, router 110A forwards each packet of the second forward packet flow in order along the same second path toward server 103. Each router 110 along the second path forwards the second plurality of packets of the second packet flow toward server 103, and server 103 receives the second plurality of packets (322).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    forwarding, by a router and along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the router is configured to forward each packet of the first plurality of packets in order along the same first path,
    determining, by the router, that the first path should not be used for the first stateful routing session;
    in response to the determination, forwarding, by the router and along a second path, at least one packet of the first forward packet flow of the first stateful routing session, wherein the router is configured to forward the at least one packet along the second path, causing the destination device to reject the at least one packet, the rejection causing the source device to establish a second stateful routing session between the source device and the destination device, and
    forwarding, by the router and along the second path, a second plurality of packets of a second forward packet flow of the second stateful routing session, wherein the second stateful routing session comprises the second forward packet flow and a second reverse packet flow between the source device and the destination device, and wherein the forwarding comprises forwarding each packet of the second plurality of packets in order along the same second path.

2. The method of claim 1,
    wherein the router comprises a first egress interface and a second egress interface,
    wherein forwarding, by the router and along the first path, the first plurality of packets comprises forwarding, by the router, via the first egress interface, and along the first path, the first plurality of packets along the first path, and
    wherein forwarding, by the router and along the second path, the at least one packet comprises forwarding, by the router, via the second egress interface, and along the second path, the at least one packet.

3. The method of claim 1,
    wherein a first Network Address Translation (NAT) service is applied to the first plurality of packets of the first forward packet flow forwarded along the first path, and
    wherein a second NAT service is applied to the at least one packet of the first forward packet flow forwarded along the second path, and
    wherein the application of the second NAT service to the at least one packet is configured to cause the destination device to reject the at least one packet.

4. The method of claim 1, wherein determining that the first path should not be used for the first stateful routing session is based on detecting a fault along the first path.

5. The method of claim 1, wherein determining that the first path should not be used for the first stateful routing session is based on determining that a priority of the second path is higher than a priority of the first path.

6. The method of claim 1,
    wherein the first stateful routing session comprises a first Internet Protocol Security (IPSec) tunnel between the source device and the destination device,
    wherein the second stateful routing session comprises a second IPsec tunnel between the source device and the destination device, and
    wherein forwarding the at least one packet along the second path causes the destination device to reject the at least one packet, the rejection causing the source device to establish the second IPsec tunnel between the source device and the destination device.

7. The method of claim 1,
    wherein the first stateful routing session comprises a first Transmission Control Protocol (TCP) session between a first client device and a second client device,
    wherein the second stateful routing session comprises a second TCP session between the first client device and the second client device,
    wherein forwarding the at least one packet along the second path causes the destination device to transmit, in response to receiving the at least one packet, a TCP reset message to the source device, the TCP reset message causing the source device to establish the second TCP session between the first client device and the second client device.

8. The method of claim 1,
    wherein one of the first path and the second path comprises one or more first routers that perform session-based routing of network traffic by modifying at least a first packet of the network traffic for the first stateful routing session to include metadata specifying a session identifier for the first stateful routing; and
    wherein another of the first path and the second path comprises one or more second routers that do not perform session-based routing of the network traffic.

9. The method of claim 1,
    wherein one of the first path and the second path comprises a path across a broadband network; and
    wherein another of the first path and the second path comprises a path across a Long-Term Evolution (LTE) wireless network.

10. A router comprising processing circuitry configured to:
    forward, along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the processing circuitry is configured to forward each packet of the first plurality of packets in order along the same first path, determine that the first path should not be used for the first stateful routing session;

in response to the determination, forward, along a second path, at least one packet of the first forward packet flow of the first stateful routing session, wherein the processing circuitry is configured to forward the at least one packet along the second path, which causes the destination device to reject the at least one packet, the rejection configured to cause the source device to establish a second stateful routing session between the source device and the destination device, and forward, along the second path, a second plurality of packets of a second forward packet flow of the second stateful routing session, wherein the second stateful routing session comprises the second forward packet flow and a second reverse packet flow between the source device and the destination device, and wherein the processing circuitry is configured to forward each packet of the second plurality of packets in order along the same second path.

11. The router of claim 10,
wherein the router comprises a first egress interface and a second egress interface,
wherein to forward, along the first path, the first plurality of packets, the processing circuitry is configured to forward, via the first egress interface and along the first path, the first plurality of packets along the first path, and
wherein to forward, along the second path, the at least one packet, the processing circuitry is configured to forward, via the second egress interface and along the second path, the at least one packet.

12. The router of claim 10,
wherein a first Network Address Translation (NAT) service is applied to the first plurality of packets of the first forward packet flow forwarded along the first path, and
wherein a second NAT service is applied to the at least one packet of the first forward packet flow forwarded along the second path, and
wherein the application of the second NAT service to the at least one packet is configured to cause the destination device to reject the at least one packet.

13. The router of claim 10, wherein the processing circuitry is configured to determine that the first path should not be used for the first stateful routing session based on detecting a fault along the first path.

14. The router of claim 10, wherein the processing circuitry is configured to determine that the first path should not be used for the first stateful routing session based on determining that a priority of the second path is higher than a priority of the first path.

15. The router of claim 10,
wherein the first stateful routing session comprises a first Internet Protocol Security (IPSec) tunnel between the source device and the destination device,
wherein the second stateful routing session comprises a second IPsec tunnel between the source device and the destination device, and
wherein the processing circuitry is configured to forward the at least one packet along the second path to cause the destination device to reject the at least one packet, the rejection configured to cause the source device to establish the second IPsec tunnel between the source device and the destination device.

16. The router of claim 10,
wherein the first stateful routing session comprises a first Transmission Control Protocol (TCP) session between a first client device and a second client device,
wherein the second stateful routing session comprises a second TCP session between the first client device and the second client device,
wherein the processing circuitry is configured to forward the at least one packet along the second path causes the destination device to transmit, in response to receiving the at least one packet, a TCP reset message to the source device, the TCP reset message causing the source device to establish the second TCP session between the first client device and the second client device.

17. The router of claim 10,
wherein one of the first path and the second path comprises one or more first routers that perform session-based routing of network traffic by modifying at least a first packet of the network traffic for the first stateful routing session to include metadata specifying a session identifier for the first stateful routing session; and
wherein another of the first path and the second path comprises one or more second routers that do not perform session-based routing of the network traffic.

18. The router of claim 10,
wherein one of the first path and the second path comprises a path across a broadband network; and
wherein another of the first path and the second path comprises a path across a Long-Term Evolution (LTE) wireless network.

19. A non-transitory, computer-readable medium comprising instructions that, when executed, are configured to cause processing circuitry of a router to:

forward, along a first path, a first plurality of packets of a first forward packet flow of a first stateful routing session established by a source device between the source device and a destination device, wherein the first stateful routing session comprises the first forward packet flow and a first reverse packet flow between the source device and the destination device, and wherein the processing circuitry is configured to forward each packet of the first plurality of packets in order along the same first path, determine that the first path should not be used for the first stateful routing session;

in response to the determination, forward, along a second path, at least one packet of the first forward packet flow of the first stateful routing session, wherein the processing circuitry is configured to forward the at least one packet along the second path, which causes the destination device to reject the at least one packet, the rejection configured to cause the source device to establish a second stateful routing session between the source device and the destination device, and forward, along the second path, a second plurality of packets of a second forward packet flow of the second stateful routing session, wherein the second stateful routing session comprises the second forward packet flow and a second reverse packet flow between the source device and the destination device, and wherein the processing circuitry is configured to forward each packet of the second plurality of packets in order along the same second path.

20. The non-transitory computer-readable medium of claim 19,
- wherein a first Network Address Translation (NAT) service is applied to the first plurality of packets of the first forward packet flow forwarded along the first path, and
- wherein a second NAT service is applied to the at least one packet of the first forward packet flow forwarded along the second path, and
- wherein the application of the second NAT service to the at least one packet is configured to cause the destination device to reject the at least one packet.

* * * * *